US009348635B2

(12) United States Patent
Khasnabish

(10) Patent No.: US 9,348,635 B2
(45) Date of Patent: May 24, 2016

(54) METHOD AND SYSTEM FOR DETERMINING REQUIREMENTS FOR INTERFACE BETWEEN VIRTUAL NETWORK ELEMENTS AND NETWORK HYPERVISOR FOR SEAMLESS (DISTRIBUTED) VIRTUAL NETWORK RESOURCES MANAGEMENT

(71) Applicant: ZTE (USA) INC., Austin, TX (US)

(72) Inventor: Bhumip Khasnabish, Lexington, MA (US)

(73) Assignee: ZTE (USA) Inc., Austin, TX (US)

( * ) Notice: Subject to any disclaimer, the term of this patent is extended or adjusted under 35 U.S.C. 154(b) by 7 days.

(21) Appl. No.: 14/163,393

(22) Filed: Jan. 24, 2014

(65) Prior Publication Data
US 2014/0215466 A1   Jul. 31, 2014

Related U.S. Application Data

(60) Provisional application No. 61/758,333, filed on Jan. 30, 2013.

(51) Int. Cl.
G06F 9/45    (2006.01)
G06F 9/455   (2006.01)
H04L 12/24   (2006.01)

(52) U.S. Cl.
CPC ........ *G06F 9/45558* (2013.01); *H04L 41/0803* (2013.01); *H04L 41/5054* (2013.01); *H04L 41/5096* (2013.01); *G06F 2009/45595* (2013.01)

(58) Field of Classification Search
None
See application file for complete search history.

(56) References Cited

U.S. PATENT DOCUMENTS

2014/0115578 A1*  4/2014  Cooper et al. ............... 718/1
2014/0137109 A1*  5/2014  Sharma et al. .............. 718/1

* cited by examiner

*Primary Examiner* — Chuck Kendall
(74) *Attorney, Agent, or Firm* — Drinker Biddle & Reath LLP

(57) ABSTRACT

A method for determining and then abstracting the requirements for the interface between virtual network entity or element (VNE) and Network Hypervisor (NHV) is described. The abstraction helps creation of an open and interoperable VNE-NHV environment because suitable interworking Apps for interface can now be easily invoked on the basis of instantaneous demands from the services. Automation of configuration together with assignment of VNEs mitigates the impact of limitation of resources in any network. Once an NHV is created and the VNEs—irrespective of their domains—are attached to it, the VNEs can be utilized by the services seamlessly.

23 Claims, 3 Drawing Sheets

METHOD AND SYSTEM FOR DETERMINING REQUIREMENTS FOR INTERFACE BETWEEN VIRTUAL NETWORK ELEMENTS AND NETWORK HYPERVISOR FOR SEAMLESS (DISTRIBUTED) VIRTUAL NETWORK RESOURCES MANAGEMENT

CROSS REFERENCE TO RELATED APPLICATIONS

This application claims benefit under 35 USC 119(e) to U.S. Provisional Application Ser. No. 61/758,333, filed on Jan. 30, 2013, which is incorporated herein by reference in its entirety.

FIELD OF THE INVENTION

The present invention describes a mechanism for determining and then abstracting the requirements for the interface between VNE and NHV.

These VNEs include router, routing/topology database, firewall, load balancer, etc. Many other devices that offer value-added layer-3 (of ISO's OSI model) services can be also considered as network layer entities. These may include Compute, storage, link/channel, routing and forwarding table/engine, firewall, policy/service-quality manager, loan balancer/distributor, etc.

NHV is a software-defined multi-connected layer-3 overlay network which (a) is fully-decoupled from the underlying physical network, and (b) can interwork seamlessly with any server hypervisor. NHV has full visibility and controllability—including provisioning and management—of all of the VNEs that are attached to it irrespective of the domain.

The VNE attachment must be via an open and interoperable interface that satisfies all of the requirements that are developed in this patent application.

At any point in time, if any of the requirements are violated, the associated VNE can be decommissioned (detached) from the NHV. Similarly, if a previously detached VNE is repaired or become active with compliant interlace, it can be automatically added to the NHV. This auto-commissioning/-decommissioning feature has the following advantages: (i) VNEs with faults or faulty interface can be automatically isolated without the overhead of extensive diagnosis, and (ii) capable VNEs with compliant interfaces can be automatically attached to the NHV.

The VNEs that can be attached to and detached from the NHV include the following entities:
 (Virtualized) network port
 (Virtualized) network link
 (Virtualized) forwarding table
 (Virtualized) DNS(Virtualized) load balance
 (Virtualized) AAA server
 (Virtualized) routing engine
 (Virtualized) value-added networked service entities

BACKGROUND OF THE INVENTION

Present day process of virtualization of network entities and attaching them to a Hypervisor is mostly concerned with layer-2 based entities and server-level hypervisor.

Virtualization of layer-3 entities is almost always done on proprietary basis, and the way the VNEs are attached to a network level, if any, Hypervisor uses proprietary interface.

These currently available/practiced methods and solutions create islands of virtualized layer-3 networks and services and defeat the entire motivation[1] of using virtualization. For examples, some solutions focus solely on network operating system, some provide seamless access to network management aspects of virtualized entities (not necessarily always the VNEs), and others attempt to support distributed network elements (often virtualized); all use proprietary interface to often 'undefined' or proprietary network hypervisor.

[1] The motivation is to share distributed virtualized resources seamlessly across different domains based on the demand from applications and services.

The current invention focuses on open and interoperable NHV based solution instead of operating on layer-2-based Hypervisor domain.

Note that layer-2-based Hypervisor typically covers broadcast domain over small geographical (room, campus, a small city, etc.) area, whereas the network layer covers a wide geographical area (like big city, state, country, and beyond), and hence is more attractive for automated load balancing and disaster recovery.

SUMMARY OF THE INVENTION

This invention focuses on attachment of virtualized layer-3 network entities to NHV via open and interoperable interfaces.

The result is seamless interoperability of distributed virtualized network (layer-3) entities and resources over a wider geographical area instead of over a broadcast (layer-2 or local area network or LAN) domain only.

Since NHV operates truly at the network (layer-3) layer, this opens up the possibility of effectively developing wide-area network-aware services and devices, and similarly service-/device-aware networks.

In other aspects, the invention provides a system and a computer program having features and advantages corresponding to those discussed above.

BRIEF DESCRIPTION OF THE DRAWINGS

The accompanying drawings are included to provide a further understanding of the invention, and are incorporated in and constitute a part of this specification. The drawings illustrate disclosed embodiments and/or aspects and, together with the description, serve to explain the principles of the invention, the scope of which is determined by the claims.

Figure 1:
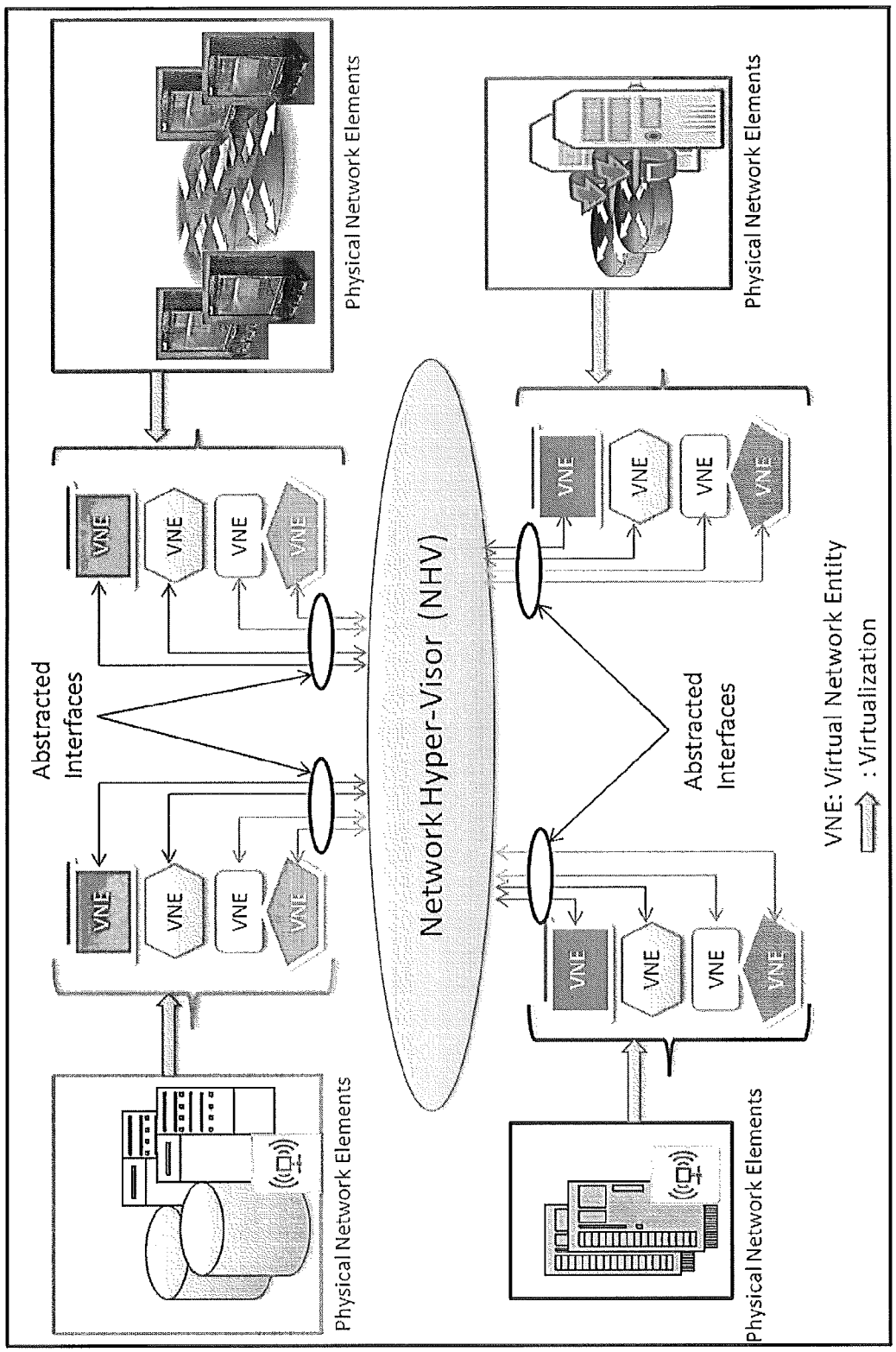

Having thus described the invention in general terms, reference will now be made to the accompanying drawings, which are not necessarily drawn to scale, and wherein:

FIG. 1 shows a high-level schematic of how virtualized network entities are attached to a network hypervisor via abstracted interfaces.

Figure 2:
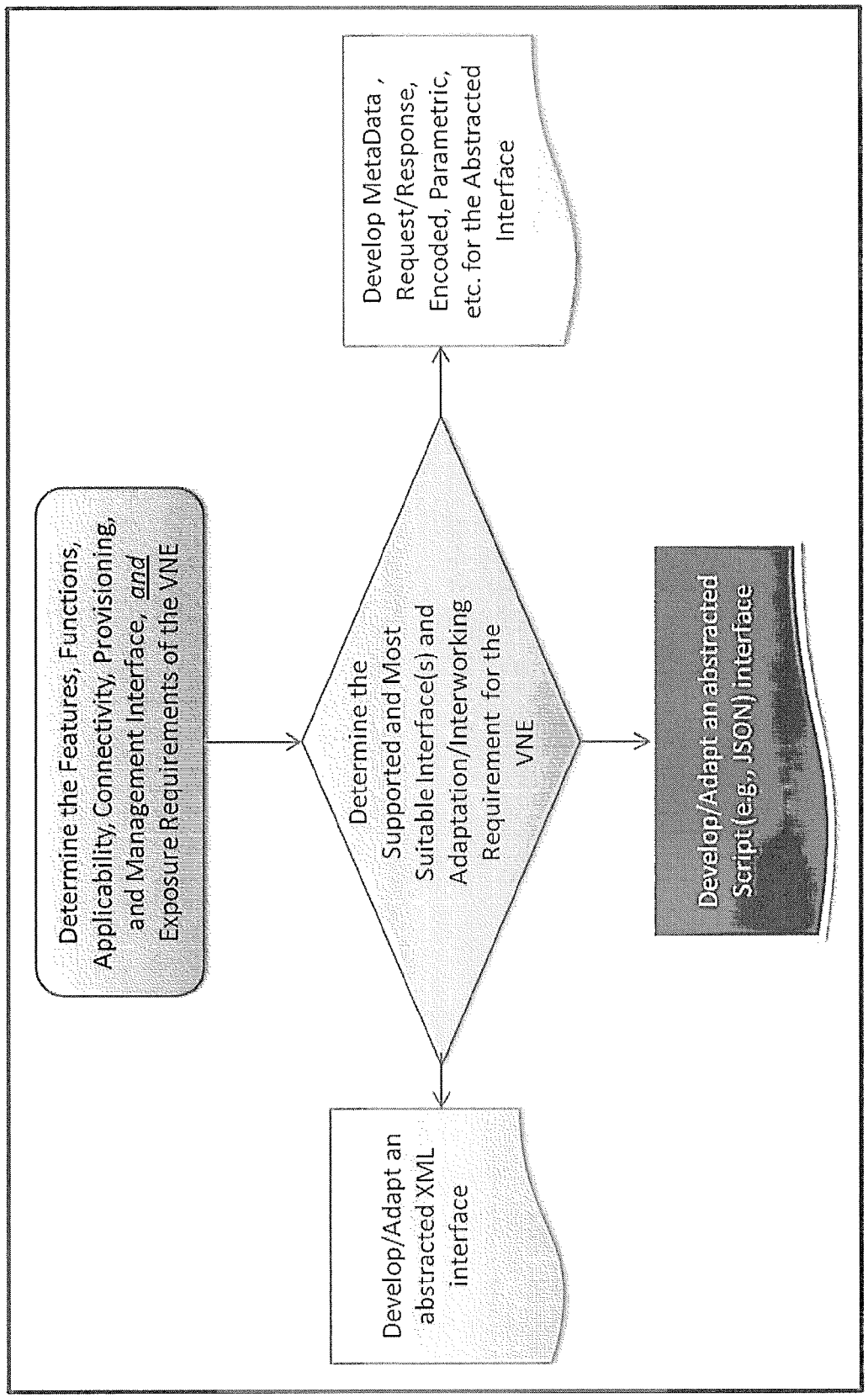

FIG. 2 illustrates how the requirements for the interface between VNE and NHV are determined, abstracted, and then adapted/interworked.

Figure 3:
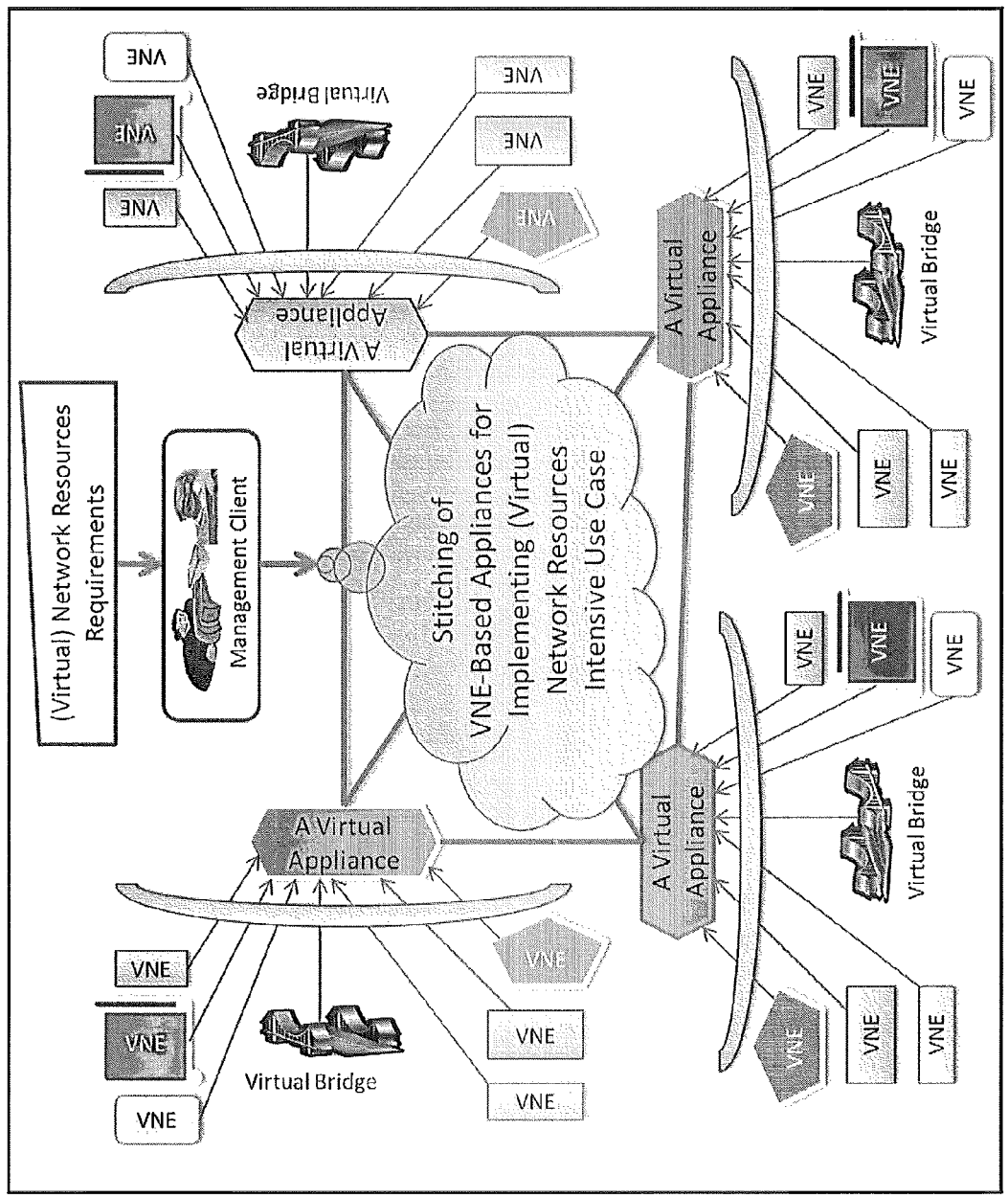

FIG. 3 demonstrates the implementation of a use case by stitching together VNEs from across a wide area.

DETAILED DESCRIPTION OF THE INVENTION

It is to be understood that the figures and descriptions provided herein may have been simplified to illustrate elements that are relevant for a clear understanding of the present invention, while eliminating, for the purpose of clarity, other elements found in typical method and system for determining requirements for interface between virtual network elements and network hypervisor for seamless (distributed) virtual network resources management. Those of ordinary skill in the art may recognize that other elements and/or steps may be desirable and/or necessary to implement the devices, systems, and methods described herein. However, because such elements and steps are well known in the art, and because they do not facilitate a better understanding of the present invention, a discussion of such elements and steps may not be provided herein. The present disclosure is deemed to inherently include all such elements, variations, and modifications to the disclosed elements and methods that would be known to those of ordinary skill in the pertinent art of network virtualization.

The present inventions now will be described more fully hereinafter with reference to the accompanying drawings:

FIG. 1 shows a high-level schematic of how virtualized network entities are attached to a network hypervisor via abstracted interfaces. The abstraction is performed in real-time in order to determine what interworking or adaptation may be required to commission a VNE to the NHV.

FIG. 2 illustrates how the requirements for the interface between VNE and NHV are determined, abstracted, and then adapted/interworked for seamless attachment of the VNE to the NHV. These VNEs are subsequently commissioned for use by Apps and services over wide geographic area through the NHV.

FIG. 3 demonstrates the implementation of a use case where VNEs from across a wide area stitched together for an Apps or service for which the requirements on the number of VNEs needed for the service is constantly changing Although specific terms are employed herein, they are used in a generic and descriptive sense only and not for purposes of limitation.

Although the invention has been described and illustrated in exemplary forms with a certain degree of particularity, it is noted that the description and illustrations have been made by way of example only. Numerous changes in the details of construction and combination and arrangement of parts and steps may be made. Accordingly, such changes are intended to be included in the invention, the scope of which is defined by the claims.

What is claimed is:

1. A method for attaching one of a plurality of virtualized (OSI) layer-3 network entities (VNEs) to a network hypervisor (NHV), the method comprising:
   realizing the VNE entirely within Open Systems Interconnection (OSI) model layer-3 of a wide-area network in which the NHV is disposed;
   determining a complete set of features, functions, applicability, connectivity, provisioning, management interface, and exposure requirements of the VNE as interoperability characteristics of the VNE;
   abstracting the interoperability characteristics to permit attachment of the VNE to the NHV;
   defining at least one open, interoperable interface for use in communicatively coupling the VNE to the NHV, wherein the VNE side of the interface is entirely in layer-3;
   realizing the at least one interface entirely in layer-3 on the VNE side of the interface; and
   attaching the VNE to the NHV through the at least one realized interface.

2. The method of claim 1, wherein the at least one VNE is a virtualized network port.

3. The method of claim 1, wherein the at least one VNE is a virtualized network link.

4. The method of claim 1, wherein the at least one VNE is a virtualized forwarding table.

5. The method of claim 1, wherein the at least one VNE is a virtualized DNS.

6. The method of claim 1, wherein the at least one VNE is a virtualized load balancer.

7. The method of claim 1, wherein the at least one VNE is a virtualized AAA server.

8. The method of claim 1, wherein the at least one VNE is a virtualized routing engine.

9. The method of claim 1, wherein the at least one VNE is a virtualized value-added networked service entity.

10. The method of claim 1, further comprising:
    stitching the at least one VNE to at least a second VNE through the at least one interface for implementing use of the at least two VNEs across an area.

11. The method of claim 1, wherein the at least one interface is an abstracted interface.

12. A computer-implemented method for decommissioning, isolating, restoring, and then reattaching a virtualized network entity (VNE) that is virtualized entirely within (OSI) layer 3 from and to a network hypervisor (NHV), the method comprising automatically:
    determining that the VNE is non-functioning;
    decommissioning the non-functioning VNE and decoupling it from the NHV;
    repairing non-functioning VNE;
    determining a complete set of features, functions, applicability, connectivity, provisioning, management interface, and exposure requirements of the VNE as interoperability characteristics of the VNE;
    abstracting the interoperability characteristics to permit attachment of the VNE to the NHV;
    adapting at least one open, interoperable interface between the VNE and the NHV, wherein the side of the interface coupled to the VNE is entirely in layer-3; and
    attaching the VNE to the NHV through the at least one adapted interface.

13. A computer system for attaching one of a plurality of virtualized (OSI) layer-3 network entities (VNEs) to a network hypervisor (NHV), the system comprising:
    means for determining a complete set of features, functions, applicability, connectivity, provisioning, management interface, and exposure requirements of the VNE as interoperability characteristics of the VNE;
    means for abstracting the interoperability characteristics to permit attachment of the VNE to the NHV;
    means for defining at least one open, interoperable interface for use in communicatively coupling the VNE to the NHV, wherein the VNE side of the interface is entirely in layer-3;
    means for realizing the at least one interface entirely in layer-3 on the VNE side of the interface; and; and
    means for attaching the VNE to the NHV through the at least one realized interface.

14. The system of claim 13, wherein the at least one VNE is a visualized network port.

15. The system of claim 13, wherein the at least one VNE is a visualized network link.

16. The system of claim 13, wherein the at least one VNE is a virtualized forwarding table.

17. The system of claim 13, wherein the at least one VNE is a virtualized DNS.

18. The system of claim 13, wherein the at least one VNE is a virtualized load balancer.

19. The system of claim 13, wherein the at least one VNE is a visualized AAA server.

20. The system of claim 13, wherein the at least one VNE is a visualized routing engine.

21. The system of claim 13, wherein the at least one VNE is a virtualized value-added networked service entity.

22. The system of claim 13, further comprising:
means for stitching the at least one VNE to at least a second VNE through the at least one interface for implementing use of the at least two VNEs across an area.

23. The system of claim 13, wherein the at least one interface is an abstracted interface.

* * * * *